(12) United States Patent
Guo

(10) Patent No.: US 12,176,954 B2
(45) Date of Patent: Dec. 24, 2024

(54) REPEATER AND COMMUNICATION SYSTEM

(71) Applicant: Shenzhen Dachi communication Co., Ltd, Shenzhen (CN)

(72) Inventor: Yibing Guo, Shenzhen (CN)

(73) Assignee: Shenzhen Dachi communication Co., Ltd, Shenzhen (CN)

( * ) Notice: Subject to any disclaimer, the term of this patent is extended or adjusted under 35 U.S.C. 154(b) by 135 days.

(21) Appl. No.: 18/093,809

(22) Filed: Jan. 5, 2023

(65) Prior Publication Data
US 2024/0162987 A1 May 16, 2024

(30) Foreign Application Priority Data
Nov. 14, 2022 (CN) .......................... 202223028648.9

(51) Int. Cl.
| | |
|---|---|
| *H04B 10/29* | (2013.01) |
| *H04B 10/2575* | (2013.01) |
| *H04B 10/40* | (2013.01) |
| *H04B 10/50* | (2013.01) |
| *H04B 10/60* | (2013.01) |

(52) U.S. Cl.
CPC ....... *H04B 10/29* (2013.01); *H04B 10/25752* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 8,989,257 | B1* | 3/2015 | Akhter | H03M 7/3059 375/240 |
| 10,684,415 | B1* | 6/2020 | Bulthuis | G02B 6/124 |
| 2011/0135308 | A1* | 6/2011 | Tarlazzi | H04B 7/0413 398/118 |
| 2014/0050212 | A1* | 2/2014 | Braz | H04B 1/005 370/343 |
| 2014/0064730 | A1* | 3/2014 | Ko | H04B 10/25754 398/43 |
| 2014/0355991 | A1* | 12/2014 | Cameirao | H04B 10/2575 398/79 |
| 2015/0229397 | A1* | 8/2015 | Shibata | H04B 10/25754 398/115 |

\* cited by examiner

*Primary Examiner* — Darren E Wolf
(74) *Attorney, Agent, or Firm* — Birchwood IP

(57) ABSTRACT

The present application relates to a repeater and a communication system. The repeater comprises a proximal device for connecting with a donor antenna and a remote device for connecting with a retransmission antenna; wherein the proximal device comprises a first multi-band combining and splitting network, a first bidirectional signal amplifying link, a first uplink and downlink combining and splitting network, and a first laser transceiver component; the remote device comprises a second multi-band combining and splitting network, a second bidirectional signal amplifying link, a second uplink and downlink combining and splitting network, and a second laser transceiver component; the first laser transceiver component is connected to the second laser transceiver component through an optical fiber. Through the above methods, the present application can reduce loss and cost.

6 Claims, 2 Drawing Sheets

REPEATER AND COMMUNICATION SYSTEM

CROSS-REFERENCE TO RELATED APPLICATIONS

This is a U.S. patent application which claims the priority and benefit of Chinese Patent Application Number 202223028648.9, filed on Nov. 14, 2022, the disclosure of which is incorporated herein by reference in its entirety.

TECHNICAL FIELD

The present application relates to the technical field of communication, in particular to a repeater and a communication system.

BACKGROUND

The repeater communication system is generally composed of an antenna and a repeater host. The repeater host usually comprises components or modules such as RF duplexers, low-noise amplifiers, mixers, Electronic-Controlled Attenuator, filters, and power amplifiers. It comprises uplink and downlink amplifying links. The basic principle of the repeater is: use the donor antenna to receive the downlink signal of the base station into the repeater, amplify the useful signal through the low noise amplifier, suppress the noise signal in the signal, and improve the signal-to-noise ratio (S/N); After being down-converted to the intermediate frequency signal, filter by the filter, amplify the intermediate frequency, and then shift and up-convert to the radio frequency, amplify by the power amplifier, and transmit to the client by the retransmission antenna; at the same time, receive the uplink signal of the client by the retransmission antenna, and process the uplink signal by the uplink amplifying link along the opposite path: that is, the uplink signal is transmitted through the low-noise amplifier, down-converter, filter, intermediate amplifier, up-converter, and power amplifier, thereby achieving bidirectional communication between the base station and the client.

In the repeater installation, for the signal blind spot area, it is impossible to find a location with sufficient signal strength to install the donor antenna within tens of meters or even hundreds of meters around it. In order to obtain sufficient signal strength, such as an underground garage in the middle of a high-rise complex, or residents living in a valley, must install the donor antenna very far away. If the repeater host is placed close to the donor antenna, the distance between the repeater host and the retransmission antenna will be very far, and a very long RF coaxial cable connection is required between the repeater host and the retransmission antenna. If the repeater host is placed close to the retransmission antenna, the distance between the repeater host and the donor antenna will be very far, and a very long radio frequency coaxial cable connection is also required between the repeater host and the donor antenna. Therefore, regardless of whether the host of the repeater is installed on the side of the donor antenna or the side of the retransmission antenna, it is necessary to use a long cable to connect the antenna away from the side of the repeater host. Limited by the attenuation characteristics of the RF coaxial cable, the length of the cable usually does not exceed 30 meters. If the distance between the donor antenna and the retransmission antenna is long, it is necessary to add a bidirectional line amplifier to compensate for the loss of the cable. The farther the distance is, the more bidirectional line amplifiers are added, otherwise the repeater cannot be used. At the same time, the cost of the coaxial cable is relatively high. When the distance is long, the cable cost occupies the main part of the entire system cost, and the added bidirectional line amplifier will also greatly increase the system cost.

SUMMARY

The present application provides a repeater and a communication system to solve the problems of serious loss and high cost caused by long-distance coaxial cables in the prior art.

In order to solve the above technical problems, a technical solution provided by the present application is to provide a repeater, comprising a proximal device for connecting with a donor antenna and a remote device for connecting with a retransmission antenna;

Wherein the proximal device comprises a first multi-band combining and splitting network, a first bidirectional signal amplifying link, a first uplink and downlink combining and splitting network, and a first laser transceiver assembly; the first multi-band combining and splitting network is connected between the donor antenna and the first bidirectional signal amplifying link, and the first uplink and downlink combining and splitting network is connected to the first bidirectional signal amplifying link, the first laser transceiver assembly is connected to the first uplink and downlink combining and splitting network;

The remote device comprises a second multi-band combining and splitting network, a second bidirectional signal amplifying link, a second uplink and downlink combining and splitting network, and a second laser transceiver assembly; the second multi-band combining and splitting network is connected between the retransmission antenna and the second bidirectional signal amplifying link, and the second uplink and downlink combining and splitting network is connected to the second bidirectional signal amplifying link, the second laser transceiver assembly is connected to the second uplink and downlink combining and splitting network;

The first laser transceiver assembly is connected to the second laser transceiver assembly through an optical fiber.

Wherein, the first multi-band combining and splitting network and the second multi-band combining and splitting network both comprise high and low frequency combining and splitting device, a high frequency combining and splitting device and a low frequency combining and splitting device respectively connected to the high and low frequency combining and splitting device, high frequency duplexers connected to the high frequency combining and splitting device, and low frequency duplexers connected to the low frequency combining and splitting device;

The high and low frequency combining and splitting device of the first multi-band combining and splitting network is connected to the donor antenna, and the high frequency duplexer and the low frequency duplexer of the first multi-band combining and splitting network are respectively connected to the first bidirectional signal amplifying link, the high and low frequency combining and splitting device of the second multi-band combining and splitting network is connected to the retransmission antenna, the high frequency duplexer and the low frequency duplexer of the second multi-band combining and splitting network are respectively connected to the second bidirectional signal amplifying link.

Wherein, the first bidirectional signal amplifying link and the second bidirectional signal amplifying link both comprise high frequency downlink amplifying links, high frequency uplink amplifying links, low frequency downlink amplifying links and low frequency uplink amplifying links;

The high frequency downlink amplifying link and the high frequency uplink amplifying link of the first bidirectional signal amplifying link are respectively connected to the high frequency duplexer of the first multi-band combining and splitting network, and the low frequency downlink amplifying link and the low frequency uplink amplifying link of the first bidirectional signal amplifying link are respectively connected to the low frequency duplexer of the first multi-band combining and splitting network;

The high frequency downlink amplifying link and the high frequency uplink amplifying link of the second bidirectional signal amplifying link are respectively connected to the high frequency duplexer of the second multi-band combining and splitting network, and the low frequency downlink amplifying link and the low frequency uplink amplifying link of the second bidirectional signal amplifying link are respectively connected to the low frequency duplexer of the second multi-band combining and splitting network.

Wherein the first uplink and downlink combining and splitting network and the second uplink and downlink combining and splitting network both comprise a downlink combining and splitting network and an uplink combining and splitting network;

The high frequency downlink amplifying link and the low frequency downlink amplifying link of the first bidirectional signal amplifying link are respectively connected to the downlink combining network of the first uplink and downlink combining and splitting network, and the high frequency uplink amplifying link and the low frequency uplink amplifying link of the first uplink and downlink combining and splitting network are respectively connected to the uplink combining network of the first uplink and downlink combining and splitting network;

The high frequency downlink amplifying link and the low frequency downlink amplifying link of the second bidirectional signal amplifying link are respectively connected to the downlink combining network of the second uplink and downlink combining and splitting network, and the high frequency uplink amplifying link and the low frequency uplink amplifying link of the second bidirectional signal amplifying link are respectively connected to the uplink combining network of the second uplink-downlink combining and splitting network.

Wherein the first laser transceiver assembly comprises a downlink laser transmitter, an uplink laser receiver, and a first wavelength division multiplexer; the second laser transceiver assembly comprises an uplink laser transmitter, a downlink laser receiver and a second wavelength division multiplexer;

The downlink laser transmitter of the first laser transceiver assembly is connected between the downlink combining network of the first uplink and downlink combining and splitting network and the first wavelength division multiplexer, and the uplink laser receiver of the first laser transceiver assembly is connected between the uplink combining network of the first uplink and downlink combining and splitting network and the first wavelength division multiplexer;

The downlink laser receiver of the second laser transceiver assembly is connected between the downlink combining network of the second uplink and downlink combining and splitting network and the second wavelength division multiplexer, and the uplink laser transmitter of the second laser transceiver assembly is connected between the uplink combining network of the second uplink and downlink combining and splitting network and the second wavelength division multiplexer;

The first wavelength division multiplexer and the second wavelength division multiplexer are connected through the optical fiber.

Wherein, a plurality of remote devices are provided, and the first laser transceiver assembly further comprises an optical splitter;

The first wavelength division multiplexer is connected to the optical splitter, and the second wavelength division multiplexer of the second laser transceiver assembly of each remote device is respectively connected to the optical splitter through an optical fiber.

The present application also provides a communication system, comprises a donor antenna, a retransmission antenna, and a repeater connected to the donor antenna and the retransmission antenna, and the repeater is the repeater described in any one of the above.

The beneficial effect is: the repeater of the present application comprises a proximal device for connecting with the donor antenna and a remote device for connecting with the retransmission antenna; wherein, the proximal device is connected to the remote device through an optical fiber. In this way, long-distance connections can be realized through optical fibers, which can greatly reduce loss and cost compared with traditional coaxial cable connections.

BRIEF DESCRIPTION OF DRAWINGS

In order to more clearly illustrate the technical solutions in the embodiments of the present application, the drawings that need to be used in the description of the embodiments will be briefly introduced below. Obviously, the drawings in the following description are only some embodiments of the present application. For those of ordinary skill in the art, other drawings can also be obtained based on these drawings without creative work, wherein.

DETAILED DESCRIPTION

The following will clearly and completely describe the technical solutions in the embodiments of the present application with reference to the accompanying drawings in the embodiments of the present application. Obviously, the described embodiments are only part of the embodiments of the present application, not all of them. Based on the embodiments in the present application, all other embodiments obtained by persons of ordinary skill in the art without making creative efforts belong to the scope of protection of the present application.

Figure 1:
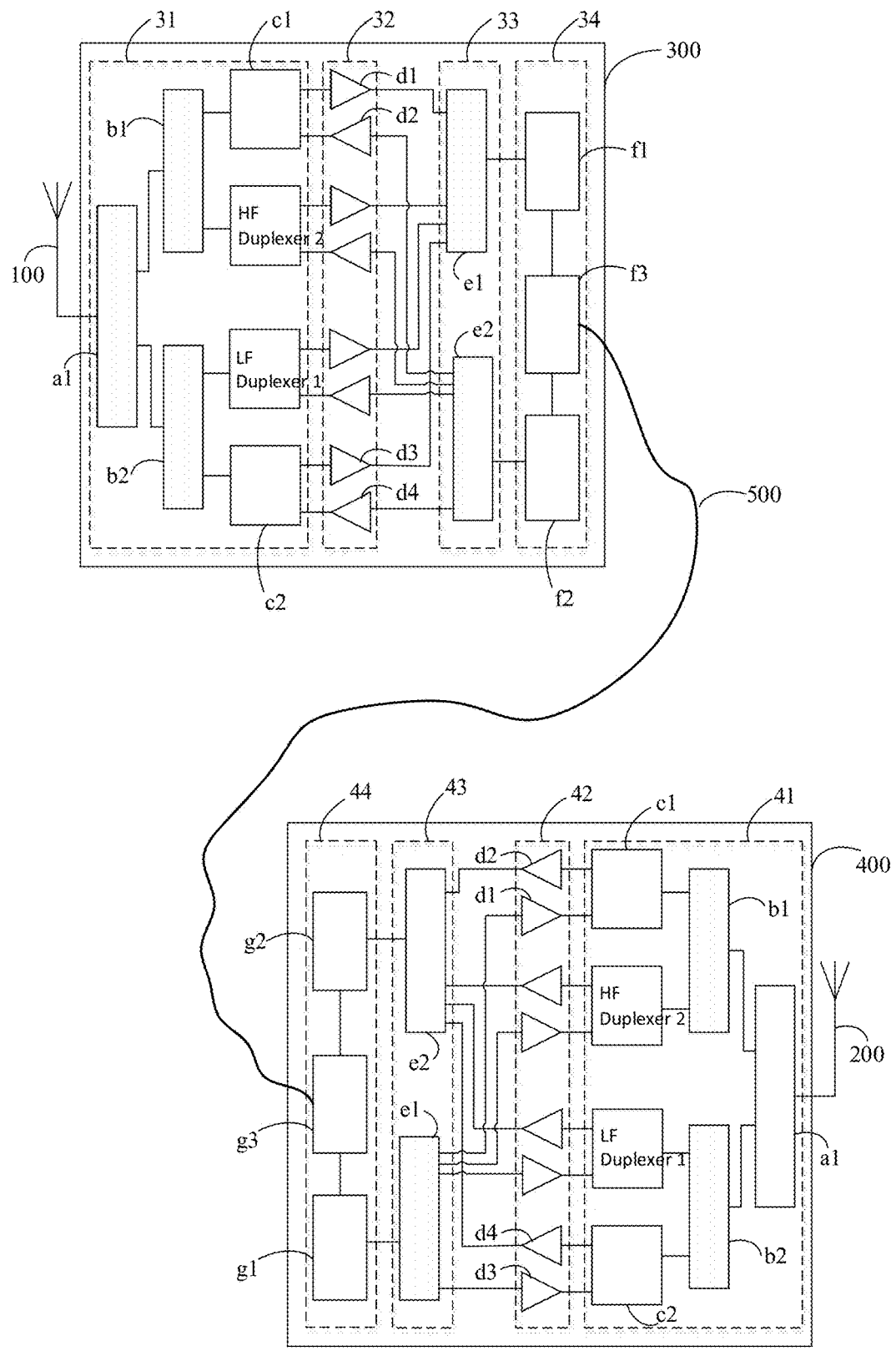
FIG. 1 is a schematic structural diagram of a repeater provided by an embodiment of the present application.

Referring to FIG. 1, a repeater provided by an embodiment of the present application comprises a proximal device 300 and a remote device 400. The proximal device 300 is used for connecting with the donor antenna 100, and the remote device 400 is used for connecting with the retransmission antenna 200.

The proximal device 300 is installed together with the donor antenna 100 for communicating with the base station, and the remote device 400 is installed together with the retransmission antenna 200 for communicating with the client. The proximal device 300 and the remote device 400 are connected through an optical fiber 500, so that uplink laser signals and downlink laser signals of various frequency bands are transmitted through the optical fiber 500.

Therefore, in the embodiment of the present application, by dividing the repeater into two, the proximal device 300 and the remote device 400, the proximal device 300 can be installed together with the donor antenna 100, and the two can be connected by a short-distance coaxial cable, and the remote device 400 can be installed together with the retransmission antenna 200, and the two can be connected by a short-distance coaxial cable, while an optical fiber 500 can be used to connect the proximal device 300 and the remote device 400 that are far away from each other. The attenuation of optical fiber is usually 0.2~0.5 dB/km, and the attenuation of coaxial cables used in consumer repeaters is usually 0.5 dB/m, which is thousands of times different; The cost of an optical fiber with the same length is only a few tenths of that of a coaxial cable, and its size and weight are much smaller than that of a coaxial cable. Therefore, in the present application, optical fiber is used for long-distance connection, which can greatly reduce loss and cost compared with the traditional method of coaxial cable connection. In remote areas such as farms, the donor antenna can be installed hundreds of meters away from the living area, which can ensure that the isolation of the donor antenna and the retransmission antenna can meet the requirements, and the retransmission antenna can be installed indoors or outdoors in the living area arbitrarily without self-excitation, thereby realizing stable full coverage indoors and outdoors in the living area.

In the embodiment of the present application, the proximal device 300 comprises a first multi-band combining and splitting network 31, a first bidirectional signal amplifying link 32, a first uplink and downlink combining and splitting network 33, and a first laser transceiver assembly 34. The first multi-band combining and splitting network 31 is connected between the donor antenna 100 and the first bidirectional signal amplifying link 32, and the first uplink and downlink combining and splitting network 33 is connected to the first bidirectional signal amplifying link 32, the first laser transceiver assembly 34 is connected to the first uplink and downlink combining and splitting network 33.

The remote device 400 comprises a second multi-band combining and splitting network 41, a second bidirectional signal amplifying link 42, a second uplink and downlink combining and splitting network 43, and a second laser transceiver assembly 44. The second multi-band combining and splitting network 31 is connected between the retransmission antenna 200 and the second bidirectional signal amplifying link 42, and the second uplink and downlink combining and splitting network 43 is connected to the second bidirectional signal amplifying link 42, the second laser transceiver assembly 44 is connected to the second uplink and downlink combining and splitting network 43.

The first laser transceiver assembly 34 is connected to the second laser transceiver assembly 44 through an optical fiber 500.

Further, in the embodiment of the present application, the first multi-band combining and splitting network 31 and the second multi-band combining and splitting network 41 both comprise high and low frequency combining and splitting device a1, a high frequency combining and splitting device b1 and a low frequency combining and splitting device b2 respectively connected to the high and low frequency combining and splitting device a1, a high frequency duplexer c1 connected to the high frequency combining and splitting device b1, and a low frequency duplexer c2 connected to the low frequency combining and splitting device b2.

The high and low frequency combining and splitting device a1 of the first multi-band combining and splitting network 31 is connected to the donor antenna 100, and the high frequency duplexer c1 and the low frequency duplexer c2 of the first multi-band combining and splitting network 31 are respectively connected to the first bidirectional signal amplifying link 32, the high and low frequency combining and splitting device a1 of the second multi-band combining and splitting network 41 are connected to the retransmission antenna 200, the high frequency duplexer c1 and the low frequency duplexer c2 of the second multi-band combining and splitting network 41 are respectively connected to the second bidirectional signal amplifying link 42.

The first bidirectional signal amplifying link 32 and the second bidirectional signal amplifying link 42 both comprise a high frequency downlink amplifying link d1, a high frequency uplink amplifying link d2, a low frequency downlink amplifying link d3 and low frequency uplink amplifying link d4;

The high frequency downlink amplifying link d1 and the high frequency uplink amplifying link d2 of the first bidirectional signal amplifying link 32 are respectively connected to the high frequency duplexer c1 of the first multi-band combining and splitting network 31, and the low frequency downlink amplifying link d3 and the low frequency uplink amplifying link d4 of the first bidirectional signal amplifying link 32 are respectively connected to the low frequency duplexer d2 of the first multi-band combining and splitting network 31;

The high frequency downlink amplifying link d1 and the high frequency uplink amplifying link d2 of the second bidirectional signal amplifying link 42 are respectively connected to the high frequency duplexer c1 of the second multi-band combining and splitting network 41, and the low frequency downlink amplifying link d3 and the low frequency uplink amplifying link d4 of the second bidirectional signal amplifying link 42 are respectively connected to the low frequency duplexer c2 of the second multi-band combining and splitting network 41.

It should be noted that a plurality of high-frequency duplexers c1 and low-frequency duplexers c2 could be provided. As shown in FIG. 1, there are two high-frequency duplexers c1, which are high frequency duplexer 1 and high frequency duplexers 2. There are also two low frequency duplexers c2, which are low frequency duplexer 1 and the low frequency duplexer. Each high frequency band corresponds to a high frequency duplexer c1, and each low frequency band corresponds to a low frequency duplexer c2, so the number of high frequency duplexers or low-frequency duplexers can be set according to the multi-band signals that need to be transmitted. In addition, the high frequency downlink amplifying link d1 and the high frequency uplink amplifying link d2 working in the same frequency band are connected to the high frequency duplexer c1 working in the same frequency band, and the low frequency downlink amplification link d3 and the low frequency uplink amplification link d4 working in the same frequency band are connected to the low frequency duplexer c2 working in the same frequency band.

The first uplink and downlink combining and splitting network 33 and the second uplink and downlink combining and splitting network 43 both comprise a downlink combining and splitting network e1 and an uplink combining and splitting network e2;

The high frequency downlink amplifying link d1 and the low frequency downlink amplifying link d3 of the first bidirectional signal amplifying link 32 are respectively connected to the downlink combining network e1 of the first uplink and downlink combining and splitting network 33, and the high frequency uplink amplifying link d2 and the low frequency uplink amplifying link d4 of the second uplink and downlink combining and splitting network 32 are respectively connected to the uplink combining network e2 of the first uplink and downlink combining and splitting network 33;

The high frequency downlink amplifying link d1 and the low frequency downlink amplifying link d3 of the second bidirectional signal amplifying link 42 are respectively connected to the downlink combining network e1 of the second uplink and downlink combining and splitting network 43, and the high frequency uplink amplifying link d2 and the low frequency uplink amplifying link d4 of the second bidirectional signal amplifying link 42 are respectively connected to the uplink combining network e2 of the second uplink-downlink combining and splitting network 43.

The first laser transceiver assembly 34 comprises a downlink laser transmitter f1, an uplink laser receiver f2, and a first wavelength division multiplexer f3; the second laser transceiver assembly 44 comprises an uplink laser transmitter g1, a downlink laser receiver g2 and a second wavelength division multiplexer g3.

The downlink laser transmitter f1 of the first laser transceiver assembly 34 is connected between the downlink combining network e1 of the first uplink and downlink combining and splitting network 33 and the first wavelength division multiplexer f3, and the uplink laser receiver f2 of the first laser transceiver assembly 34 is connected between the uplink combining network e2 of the first uplink and downlink combining and splitting network 34 and the first wavelength division multiplexer f3;

The downlink laser receiver g1 of the second laser transceiver assembly 44 is connected between the downlink combining network e1 of the second uplink and downlink combining and splitting network 43 and the second wavelength division multiplexer g3, and the uplink laser transmitter g2 of the second laser transceiver assembly 44 is connected between the uplink combining network e2 of the second uplink and downlink combining and splitting network 43 and the second wavelength division multiplexer g3;

The first wavelength division multiplexer f3 of the first laser transceiver assembly 34 and the second wavelength division multiplexer g3 of the second laser transceiver assembly 44 are connected through the optical fiber 500.

In the embodiment of the present application, both the first laser transceiver assembly 34 and the second laser transceiver assembly 34 use lasers with different wavelengths to process uplink signals and downlink signals, wherein a laser receiving tube with a wavelength of 1310 nm is used in the uplink transmission to convert the received 1310 nm laser into a radio frequency uplink signal, and a laser emitting tube with a wavelength of 1550 nm is used in the downlink transmission to convert the radio frequency downlink signal into a laser downlink signal. The wavelength division multiplexer f3 can combine laser signals with two different wavelengths into the same optical fiber 500 for transmission, and can also separate laser signals with different wavelengths in the same optical fiber 500 to realize the separation of uplink signals and downlink signals, and the wavelength division multiplexer f3 can ensure that the laser signals with the two wavelengths have sufficient isolation.

More specifically, for the uplink transmission process of the proximal device 300, its first wavelength division multiplexer f3 receives the 1310 nm laser signal sent by the second wavelength division multiplexer g3 of the second laser transceiver assembly 44, the laser signal is a laser uplink signal for the proximal device 300, and then transmits the laser uplink signal to the uplink laser receiver f2 of the first laser transceiver assembly 34. The uplink laser receiver f2 in the first laser transceiver assembly 34 can use a laser receiving tube with a wavelength of 1310 nm to convert the received 1310 nm laser uplink signal into a radio frequency uplink signal, and then transmit the converted radio frequency uplink signal to the first uplink combining and splitting network e2 of the combining and splitting network 33. The uplink combining and splitting network e2 splits the radio frequency uplink signal into radio frequency uplink signals with multiple frequency bands, and then transmits the uplink signals of each frequency band sequentially through the uplink amplifying link with corresponding frequency band (such as the high frequency uplink amplifying link), the duplexer with corresponding frequency band and the combining and splitting device with the corresponding frequency band, and transmits to the high and low frequency combining and splitting network a1. The high and low frequency combining and splitting network a1 combines the radio frequency uplink signals of each frequency band to the donor antenna 100, and the donor antenna 100 sends the radio frequency uplink signals to the base station.

For the downlink transmission process, the base station sends radio frequency downlink signals of each frequency band to the high and low frequency combining and splitting network a1 of the first multi-band combining and splitting network 31 through the donor antenna 100. The high and low frequency combining and splitting network a1 sends the radio frequency downlink signal of the high frequency band to the high frequency combining and splitting device b1, and sends the radio frequency downlink signal of the low frequency band to the low frequency combining and splitting device b2. Then the radio frequency downlink signal of the high frequency band is further distributed to the high frequency duplexer 1 and the high frequency duplexer 2 of the corresponding frequency band by the high frequency combining and splitting device b1, and the radio frequency downlink signal of the low frequency band is further distributed to the low frequency duplexer 1 and low frequency duplexer 2 of the corresponding frequency band etc. by the low frequency combining and splitting device b2. The duplexers in each frequency band then send the radio frequency downlink signal to the input end of the downlink amplifying link of the corresponding frequency band, such as the high frequency downlink amplifying link d1, the low frequency downlink amplifying link d3, and the like. The output ends of the downlink amplifying links of each frequency band are connected to the downlink combining network e1 of the first uplink and downlink combining and splitting network 33. The downlink combining network e1 combines the radio frequency downlink signals of all frequency bands to the downlink laser transmitter f1, then sends them to the optical fiber 500 through the first wavelength division multiplexer f3, and then transmits them to the second wavelength division multiplexer g3 of the remote device 400.

For the downlink transmission process of the remote device 400, the second wavelength division multiplexer g3 of the second laser transceiver assembly 44 receives the 1550 nm laser signal sent by the first wavelength division multiplexer f3 of the first laser transceiver assembly 34, wherein the laser signal is a laser downlink signal for the remote device 400, and then transmits the laser downlink signal to the downlink laser receiver g1 of the second laser transceiver assembly 44. The downlink laser receiver g1 in the second laser transceiver assembly 44 can use a laser receiving tube with a wavelength of 1550 nm to convert the received 1550 nm laser downlink signal into a radio frequency downlink signal, and then transmit the converted radio frequency downlink signal to the downlink combining and splitting network e1 of the second uplink and downlink combining and splitting network 43. The downlink combining and splitting network e1 splits the radio frequency downlink signal into radio frequency downlink signals with multiple frequency bands, and then transmits the downlink signals of each frequency band sequentially through the downlink amplifying link with corresponding frequency band (such as the high frequency downlink amplifying link d1), the corresponding frequency band, the duplexer with corresponding frequency band and the combining and splitting device with the corresponding frequency band and then transmits to the high and low frequency combining and splitting network a1. The high and low frequency combining and splitting network a1 combines the radio frequency downlink signals of each frequency band to the retransmission antenna 200, and the retransmission antenna 200 sends the radio frequency downlink signals to the base station.

For the uplink transmission process, the client sends the radio frequency uplink signals of each frequency band to the high and low frequency combining and splitting network a1 of the second multi-band combining and splitting network 41 through the retransmission antenna 200. The high and low frequency combining and splitting network a1 sends the radio frequency uplink signal of the high frequency band to the high frequency combining and splitting device b1, and sends the radio frequency uplink signal of the low frequency band to the low frequency combining and splitting device b2. Then the radio frequency uplink signal of the high frequency band is further distributed to the high frequency duplexer 1 and the high frequency duplexer 2 of the corresponding frequency band by the high frequency combining and splitting device b1, and the radio frequency uplink signal of the low frequency band is further distributed to the low frequency duplexer 1 and low frequency duplexer 2 of the corresponding frequency band etc. by the low frequency combining and splitting device b2. The duplexers in each frequency band then send the radio frequency uplink signal to the input end of the uplink amplifying link of the corresponding frequency band, such as the high frequency uplink amplifying link d2, the low frequency uplink amplifying link d4, and the like. The output ends of the uplink amplifying links of each frequency band are connected to the uplink combining network e2 of the second uplink and downlink combining and splitting network 43. The uplink combining network e2 combines the radio frequency uplink signals of all frequency bands to the uplink laser transmitter g2, then converts the radio frequency uplink signals into 1310 nm laser signals, and then sends the laser signal to the optical fiber 500 through the second wavelength division multiplexer g3, and then transmits them to the first wavelength division multiplexer f3 of the proximal device 300.

Therefore, in the embodiment of the present application, the repeater is divided into a proximal device and a remote device, and the multi-band radio frequency uplink signal and the radio frequency downlink signal are converted into laser signals therebetween. Through long-distance single-mode optical fiber transmission, it is restored to multi-band RF uplink signals and RF downlink signals at the other end. The amplifying links are located at both ends of the optical fiber, which are convenient to amplify the signal to an amplitude suitable for conversion into a laser signal, and then amplify it to a suitable level after being transmitted and restored by the optical fiber, and then transmit it to the base station or client by the antenna. Long-distance transmission through optical fiber can reduce loss and cost, and since the proximal device and the donor antenna can be installed together, and the remote device and the retransmission antenna can be installed together, the donor antenna and the proximal device can be installed in a farther area, so as to ensure the isolation of the donor antenna and the retransmission antenna.

Figure 2:
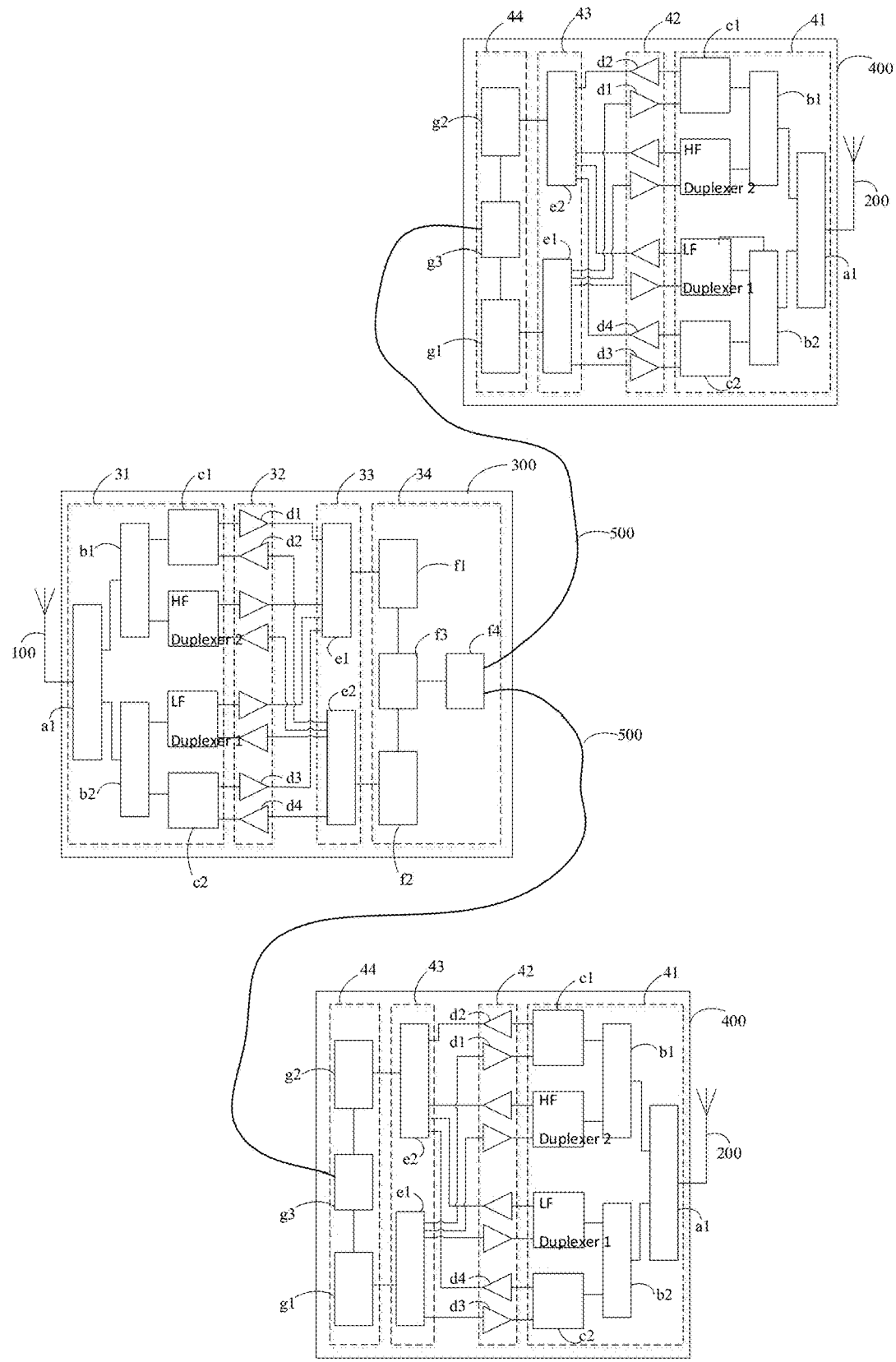
FIG. 2 is another schematic structural diagram of a repeater provided by another embodiment of the present application.

Referring to FIG. 2, in another embodiment of the present application, there is a plurality of remote devices 400, and the first laser transceiver assembly 34 further comprises an optical splitter f4. The first wavelength division multiplexer f3 of the first laser transceiver assembly 34 is connected to the optical splitter f4, and the second wavelength division multiplexer g3 of the second laser transceiver assembly 44 of each remote device 400 is connected to the optical splitter f4 through an optical fiber 500. Therefore, by connecting the remote devices 400, the purpose of covering multiple dead signal areas can be achieved.

An embodiment of the present application also provides a communication system, comprising a donor antenna, a retransmission antenna and a repeater connected to the donor antenna and the retransmission antenna, wherein the repeater is the repeater in any one of the above embodiments.

The above is only an embodiment of the present application, and does not limit the protection scope of the present application. Any equivalent structure or equivalent process transmission made by using the specification and drawings of the present application, or directly or indirectly used in other related technologies fields, are all included in the protection scope of the present application.

What is claimed is:

1. A repeater, comprising a proximal device for connecting with a donor antenna and a remote device for connecting with a retransmission antenna;

wherein the proximal device comprises a first multi-band combining and splitting network, a first bidirectional signal amplifying link, a first uplink and downlink combining and splitting network, and a first laser transceiver assembly; the first multi-band combining and splitting network is connected between the donor antenna and the first bidirectional signal amplifying link, and the first uplink and downlink combining and splitting network is connected to the first bidirectional signal amplifying link, the first laser transceiver assembly is connected to the first uplink and downlink combining and splitting network;

the remote device comprises a second multi-band combining and splitting network, a second bidirectional signal amplifying link, a second uplink and downlink combining and splitting network, and a second laser transceiver assembly; the second multi-band combining and splitting network is connected between the retransmission antenna and the second bidirectional signal amplifying link, and the second uplink and downlink combining and splitting network is connected to the second bidirectional signal amplifying link, the second laser transceiver assembly is connected to the second uplink and downlink combining and splitting network;

the first laser transceiver assembly is connected to the second laser transceiver assembly through an optical fiber.

2. The repeater according to claim 1, wherein the first bidirectional signal amplifying link and the second bidirectional signal amplifying link both comprise high frequency downlink amplifying links, high frequency uplink amplifying links, low frequency downlink amplifying links and low frequency uplink amplifying links;

the high frequency downlink amplifying link and the high frequency uplink amplifying link of the first bidirectional signal amplifying link are respectively connected to the high frequency duplexer of the first multi-band combining and splitting network, and the low frequency downlink amplifying link and the low frequency uplink amplifying link of the first bidirectional signal amplifying link are respectively connected to the low frequency duplexer of the first multi-band combining and splitting network;

the high frequency downlink amplifying link and the high frequency uplink amplifying link of the second bidirectional signal amplifying link are respectively connected to the high frequency duplexer of the second multi-band combining and splitting network, and the low frequency downlink amplifying link and the low frequency uplink amplifying link of the second bidirectional signal amplifying link are respectively connected to the low frequency duplexer of the second multi-band combining and splitting network.

3. A repeater, comprising the proximal device and the remote device according to claim 1; wherein a plurality of remote devices are provided, and the first laser transceiver assembly further comprises an optical splitter;

a first wavelength division multiplexer is connected to the optical splitter, and a second wavelength division multiplexer of the second laser transceiver assembly of each remote device is respectively connected to the optical splitter through an optical fiber.

4. A communication system, comprising a donor antenna, a retransmission antenna, and a repeater connected to the donor antenna and the retransmission antenna, and the repeater is the repeater according to claim 1.

5. The repeater according to claim 1, wherein both the first laser transceiver assembly and the second laser transceiver assembly use lasers with different wavelengths to process uplink signals and downlink signals, wherein a laser receiving tube with a wavelength of 1310 nm is used in an uplink transmission to convert a received 1310 nm laser into a radio frequency uplink signal, and a laser emitting tube with a wavelength of 1550 nm is used in a downlink transmission to convert a radio frequency downlink signal into a laser downlink signal.

6. A communication system, comprising a donor antenna, a retransmission antenna, and a repeater connected to the donor antenna and the retransmission antenna, and the repeater is the repeater according to claim 3.

* * * * *